United States Patent [19]
Baron et al.

[11] Patent Number: 5,192,342
[45] Date of Patent: Mar. 9, 1993

[54] APPARATUS FOR ENHANCING THE ENVIRONMENTAL QUALITY OF WORK SPACES

[76] Inventors: Robert A. Baron, 27 Sunnyside Rd., Scotia, N.Y. 12302; Frederick Haber, Box 138, Old Chatham, N.Y. 12136

[21] Appl. No.: 868,650

[22] Filed: Apr. 15, 1992

[51] Int. Cl.$^5$ ............................................. B01D 46/00
[52] U.S. Cl. ................................. 55/97; 55/279; 55/316; 55/387; 381/71; 422/4; 422/124; 181/206; 181/295
[58] Field of Search ................. 181/206, 295; 381/71; 55/279, 316, 387; 422/124, 4; 454/187; 55/97, 15

[56] References Cited

U.S. PATENT DOCUMENTS

| | | | |
|---|---|---|---|
| 2,945,554 | 7/1960 | Berly | 55/279 |
| 4,268,285 | 5/1981 | Mason | 55/279 |
| 5,069,876 | 12/1991 | Oshinsky | 422/4 |

OTHER PUBLICATIONS

R. A. Baron "Environmentally Induced Positive Affect: Its Impact on Self-Efficacy, Task Performance, Negotiation, and Conflict", *Journal of Applied Social Psychology*, 20 368-384 (1990).

J. S. Warm, et al. "Effects of Olfactory Stimulation on Performance and Stress in a Visual Sustained Attention Task", *J. Soc. Cosmet. Chem.* 1-12 (1991).

D. Nagar and J. Pandey "Affect and Performance on Cognitive Task as a Function of Crowding and Noise", *Journal of Applied Social Psychology* 17 147-157 (1987).

*Primary Examiner*—Bernard Nozick
*Attorney, Agent, or Firm*—Heslin & Rothenberg

[57] ABSTRACT

An apparatus for enhancing the environmental quality of work and living spaces is provided. The apparatus combines a high efficiency particulate air filter, a gas-adsorbent element, a means for moving air, a means for releasing a pleasant odor and a means for sound masking. The odor-releasing means and sound-producing means are designed to improve the affective state, and thereby the task-performance, of persons working in the space being treated. Preferred fragrances are citrus, floral, eucalyptus and mint, released at about 1 to 20 mg/hr. The sound masking is preferably accomplished by a sound-generating device which generates pink noise.

13 Claims, 4 Drawing Sheets

APPARATUS FOR ENHANCING THE ENVIRONMENTAL QUALITY OF WORK SPACES

BACKGROUND OF THE INVENTION

1. Field of the Invention

The invention relates to an apparatus for enhancing the environmental quality of work and living spaces. The apparatus combines a high efficiency particulate air filter, a gas-adsorbent element, a means for moving air, a means for releasing a pleasant odor and a means for sound masking.

2. Information Disclosure

In recent years, growing attention has been focused on the impact of affective states on both interpersonal behavior and cognitive processes. With respect to interpersonal behavior, it has been found that individuals are generally more benevolent toward others (e.g., less aggressive, more helpful) when experiencing positive affect than when in a neutral mood or when experiencing negative affect. With respect to cognitive processes, it appears that even relatively mild shifts in current affect can influence both the encoding and retrieval of a wide range of information. Individuals experiencing positive affect seem to organize information differently—perhaps more inclusively —than persons not experiencing such reactions. They provide more unusual associates to neutral words and perceive nontypical exemplars of a category as more representative of that category than subjects in whom positive affect has not been induced. Persons experiencing positive affect are more likely to demonstrate risk-prone behavior when potential losses are small, but more likely to demonstrate risk-avoidance when potential losses are large. Finally, individuals experiencing positive affect perform more effectively on certain tasks (one involving creative problem solving) than do controls.

As information on the behavioral and cognitive impact of affective states has accumulated, many efforts have been made to apply such knowledge to behavior in applied settings. A number of recent studies have investigated the impact of affective states upon various aspects of work-related behavior. Together, this research suggests that relatively mild shifts in affective states can exert appreciable effects on behavior in work settings. Finally, recent evidence suggests that positive affect may enhance performance on difficult tasks, especially ones requiring creativity.

Such research indicates that both positive and negative affect can be readily generated by environmental conditions. Stressors such as excessive heat, irritating noise, or unpleasant aromas generate substantial levels of negative affect. Correspondingly, several environmental factors appear to produce positive affective states, including certain kinds of music, pleasant climatic conditions, and pleasant scents or aromas. Pleasant aromas can be readily introduced into home or work environments; indeed, many commercial products specifically designed to accomplish this goal exist (air fresheners and room deodorizers). To the extent that pleasant scents yield any of the positive effects described above (e.g., enhanced task performance, improved negotiations), they provide a simple and relatively cost-effective type of intervention. [See Baron *J. Appl. Social Psych.* 20, 368-384 (1990) and references therein.] FIG. 1 is a graph of performance vs time for a repetitive task in the presence and absence of a fragrance (taken from Warm et al. *J. Soc. Cosmetic Chem.* 1991, 1-12). The percentage of correct detection of signals is presented on the vertical axis; four ten minute trial periods are presented on the horizontal axis. The curve for correct detection was higher at all time periods in the presence of peppermint fragrance.

A particularly advantageous way to dispense pleasant aromas in a work or living space is to release them into an airflow that is circulating through the work or living space. Simply circulating the air would suffice to dispense the pleasant fragrance; however, simply circulating ambient air would also circulate mold, pollen, animal dander, dust and bacterial spores, in addition to the pleasant fragrance. It may be reasonably assumed that these other airborne irritants would detract from the effect of the fragrance and that their removal would improve the effect of the fragrance. High efficiency particulate air (HEPA) filters provide the means for removing 99.9% of particulate matter from the air, but because such filters are extremely dense (they remove particles as small as 0.3 microns), they require powerful transfer blower air systems to move air through their compact network of fibers. The resulting apparatus suffers from the drawback that any known means of moving a significant volume of air generates noise roughly proportional to the volume of air being moved and filtered. The current ASHRAE standards for offices and homes require 5 to 12 minutes per air change or 66 to 160 cfm for an $8 \times 10 \times 10$ room. Since noise, particularly the high-frequency noise of air-filtering machinery, is likely to act as a source of negative affect, [see Nagar and Pandey *J. Appl. Social Psych.* 17 147-157 (1987)] whatever positive contribution is made by pleasant fragrance and removal of airborne irritants is likely to be vitiated by the noise. Although the noise problem could, in principle, be mitigated by removing the air moving machinery to a site remote from the work or living space, this is a measure that can be applied only in certain circumstances.

There is therefore a need for a portable air-moving and filtering apparatus that would include a means for releasing a pleasant fragrance and that would not bathe the work or living space in an irritating noise. The present invention offers a way of turning the noise liability to an asset: it combines the sound produced by the air filtering system with a deliberately created additional sound to produce a positive affect-inducing pink noise. This sound effectively masks distracting noise from surrounding areas.

SUMMARY OF THE INVENTION

It is an object of the invention to enhance the quality of a work space so a to improve the behavioral and cognitive performance of persons working therein.

It is a further object of the invention to provide a portable air purifying system that includes a means for releasing a pleasant fragrance and a means for sound masking.

The invention relates to an apparatus for enhancing the environmental quality of work and living spaces comprising:

a) a portable housing;

b) a high efficiency particulate air (HEPA) filter mounted in said housing, said HEPA filter having an intake surface and an output, said intake surface being accessible to air from the exterior of said housing;

c) a gas adsorbing filter mounted in said housing, said gas adsorbing filter having an intake surface and an output surface, said intake surface of said gas adsorbing filter receiving air substantially entirely from said output surface of said HEPA filter;

d) means for generating airflow from the exterior of said housing through said HEPA filter and said gas adsorbing filter and back to the exterior of said housing;

e) means, disposed in said housing downstream of said gas adsorbing filter, for releasing into said airflow a controllable amount of fragrance; and f) means, disposed in said housing, for generating sound of a frequency and strength such that the combined acoustic output of said sound generating means and said airflow generating means is broad band noise having no outstanding pure tones, said acoustic output comprising sound waves in the range from 80 Hz to 10 KHz in frequency and 10 to 70 dB in strength.

A preferred airflow is from 80 to 130 cfm (27 to 62 L/sec). A preferred rate of release of fragrance is from 1 to 20 mg/hr. Preferred fragrances are chosen from the group consisting of citrus, floral, eucalyptus and mint fragrances, and the preferred means for release is from a polyolefin body having the fragrance entrained therein. The preferred acoustic output is pink noise, and the preferred gas adsorbing filter is a charcoal filter.

In another aspect the invention relates to an apparatus for enhancing the environmental quality of a workplace comprising:

(a) a housing having two ends and first, second and third sides;
(b) said ends being in the form of triangles;
(c) said first, second and third sides being in the form of rectangles;
(d) said first, second and third sides being joined each to one other at two opposite edges of said rectangles and to said ends at two other opposite edges of said rectangles;
(e) said first side supporting a plurality of controls and an air intake;
(f) said second side providing an air outlet;
(g) said third side forming a base substantially in a horizontal plane; and
(h) said housing enclosing filter means, air moving means, fragrance-releasing means and sound-generating means.

In yet a further aspect, the invention relates to a method for enhancing the environmental quality of a workspace comprising in combination:

(a) lowering the level of particulate matter in a body of air within said workspace below $10^4$ particles per liter;
(b) introducing a fragrance into said air in said workspace; and
(c) introducing broad band noise into said workspace, said broad band noise comprising sound waves in the range from 80 Hz to 10 KHz in frequency and 10 to 70 dB in strength and having no outstanding pure tones.

DESCRIPTION OF PREFERRED EMBODIMENTS

Figure 3:
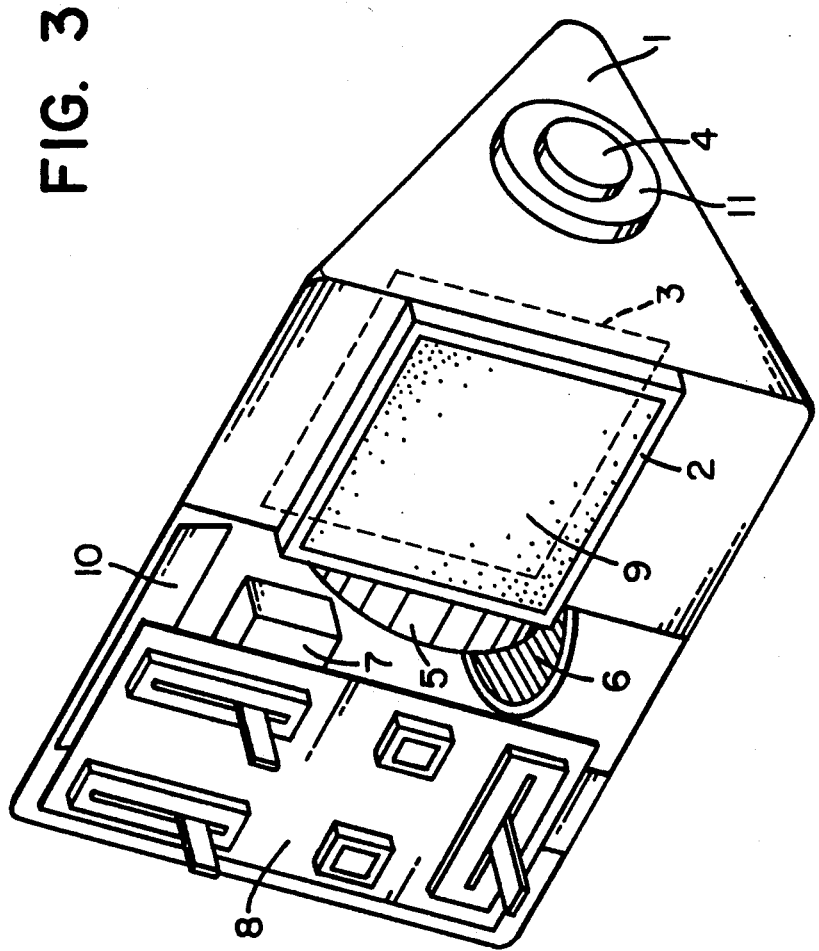
FIG. 3 is an oblique view of an apparatus according to the invention.

A schematic diagram of an apparatus according to the invention is shown in FIG. 3. The particular embodiment shown comprises a housing 1, an HEPA filter 2, a carbon filter 3, a disc impregnated with fragrance 4, in a fragrance release apparatus 11, an electric radial flow blower 5, a speaker 6, a circuit for producing pink noise 7, and controls 8 for modulating the blower speed and sound output. If desired, a prefilter may be interposed upstream of the HEPA filter. The prefilter is preferably a 20% ASHRAE filter of about 6.3 mm thickness.

In normal operation air is drawn in through intake orifice 9 by blower 5 which forces the air through filters 2 and 3 over the circuit board 7 and the fragrance releasing disc 4 and out the output orifice 10. The sound output of the speaker 6 is adjusted by the user to suit the user's needs at the time. The housing 1 is conveniently fabricated of galvanized or stainless steel, but may also be made from another metal such as aluminum or from a plastic. The air circulating means is preferably an electric blower of the backward curved impeller type, available from EBM Inc. (Farmington, Connecticut). An optional prefilter, if present, may be any standard 20% ASHRAE dust arrestance filter. Such filters may be obtained commercially from the Farr Filter Co. (Anaheim, California). The HEPA filter may be any filtering means that is capable of removing 99.97% of particles of 0.3 $\mu$m with a throughput of 80 to 130 cfm (37 to 62L/sec). HEPA filters consist of sheets of extremely dense networks of glass fibers. These filter media are produced through a process akin to that of paper manufacture; however, fibers contained in the filter medium are glass rather than cellulose. The glass fiber strands are 0.25–3.0 microns in diameter, and are interconnected to provide a medium with very small openings (pores). Studies have shown that, under controlled conditions, a HEPA filter running at ASHRAE standard turnover rates for two hours will reduce particulate load from the normal of $0.9-1.2\times10^6$ per ft$^3$ ($3.2-4.2\times10^4$ per liter) to $3.5\times10^4$ per ft$^3$ ($1.2\times10^3$ per liter). The preferred HEPA filter consists of a pleated dry type filter enclosed in a rigid metal frame. Pleating greatly increases the surface area of filter medium that can be contained in a filter unit of a portable apparatus. HEPA filters that function in the invention are the Pleat-II available from HEPA Corp. (Anaheim, Calif.), the Bio-Med available from Northland Filter Co. (Mechanicville, N.Y.) and similar filters from the Schultes Corp. (Syracuse, N. Y.).

The gas adsorbing filter is preferably charcoal, zeolites or aluminum permanganate. A medium that can remove volatile organic compounds such as formaldehyde, carbon dioxide and carbon monoxide is particularly desirable. Charcoal is particularly preferred.

The charcoal filter may be any activated carbon-based filter that will provide the throughput described above. An example of such a charcoal filter is the flat isothermal charcoal filter pack available from D-Mark, Inc. (Mt. Clemans, Mich.). Charcoal of this type has a nominal surface area of $12.3\times10^6$ cm$^2$ per Kg. A combination of filters and blower that have sufficient throughput t recirculate the volume of the work or living space about five to ten times per hour satisfies ASHRAE standards.

The apparatus masks distracting noise through electronically-generated, modified white noise. Auditory masking is a well studied phenomenon of interference with the audibility of a sound caused by the presence of another sound. The masker and the signal may be identical or may differ in frequency, complexity, or time.

Four major effects are noted when both the masker and signal are pure tones and are presented simultaneously. First, the higher the level of the masker, the greater the masking. Second, masking is greatest when the frequency of the masker is in the vicinity of that of the signal. Third, the masking caused by a tone is much greater on frequencies below it. Fourth, in addition to the two tones themselves, other tones are heard which do not exist except in the listener's hearing. These tones are caused by nonlinear effects in the human hearing mechanism.

The most widely studied complex masking sound is random noise which has energy at all frequencies and is said to be flat if the level for each 1-Hz bandwidth of the noise is the same. When random-flat (white) noise is used to mask a pure tone, only a narrow frequency band (critical band) of the noise centered at the tonal frequency causes masking. When noise masks speech, either the detectability of speech or speech intelligibility can be measured. The level for speech intelligibility is about 10–14 dB higher than for speech detectability. White noise consists of sound of all frequencies between specified limits, and is analogous to white light, which contains light of all wave lengths within specified limits. In the apparatus of a preferred embodiment white noise is modified so as to include more strength in the low range and less strength in the high range. This can be accomplished through appropriate electronic circuitry as well known in the art. Shifting the sound in this fashion alters the nature (timbre) of the sound so that it has a more pleasant, soothing quality than would otherwise be the case.

The modified white noise produced by the preferred embodiment of the apparatus will be described by the term pink noise. Pink noise is technically defined as a noise whose intensity is inversely proportional to frequency over a specified range to give a constant energy per octave. For the purposes of the present invention, pink noise may be thought of as white noise in which the low frequencies are enhanced. An important characteristic is that the sound masking be a broad-band noise having no "spikes" of outstanding pure tones.

The system used for generating pink noise in a preferred apparatus of the invention incorporates a volume control which can be used to adjust the masking sound to a level sufficient to mask distracting noises in the immediate environment. This makes the unit flexible for use under a very wide range of conditions and in many different settings.

Figure 1:
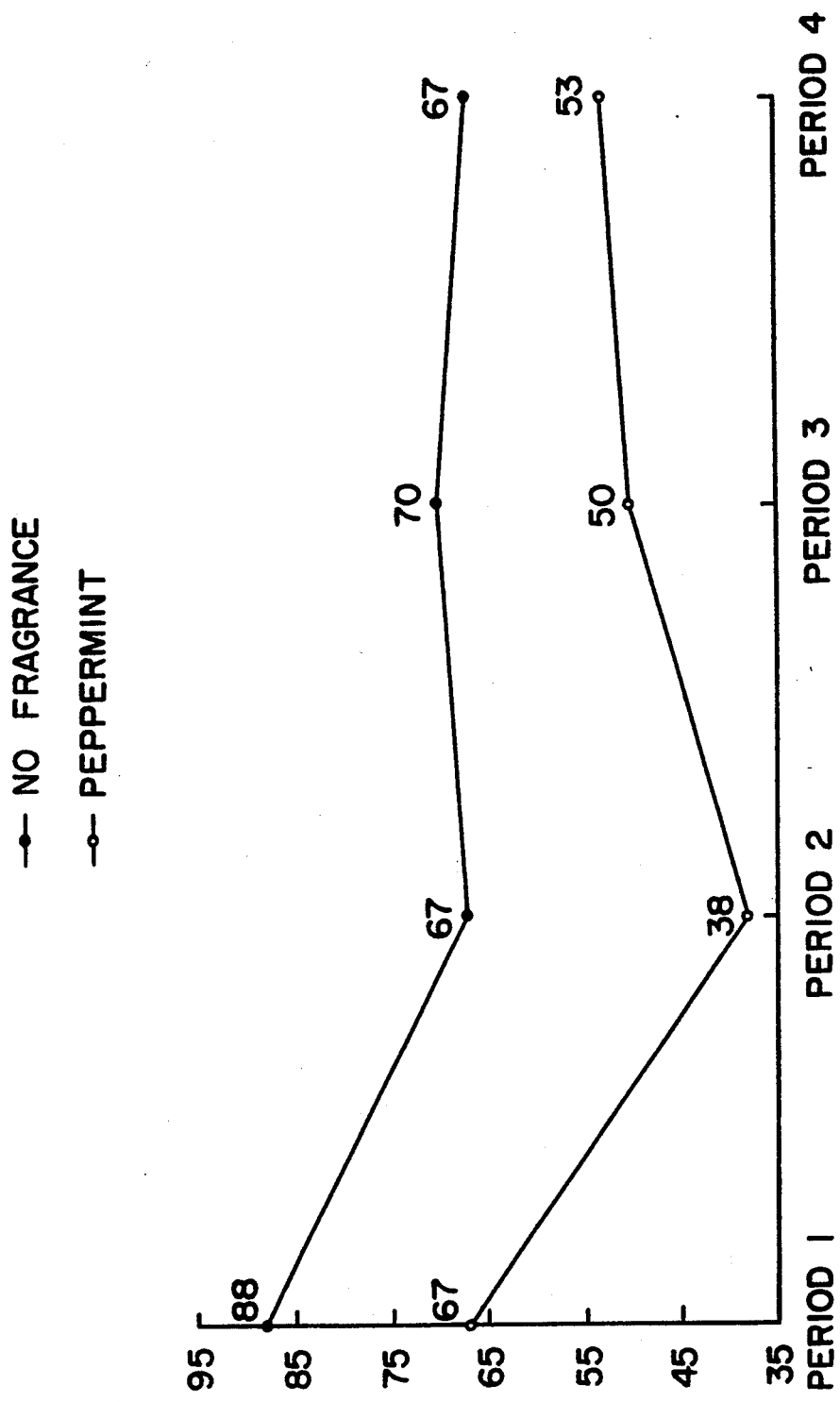
FIG. 1 is a graph showing task performance in the presence and absence of fragrance.
Figure 2:
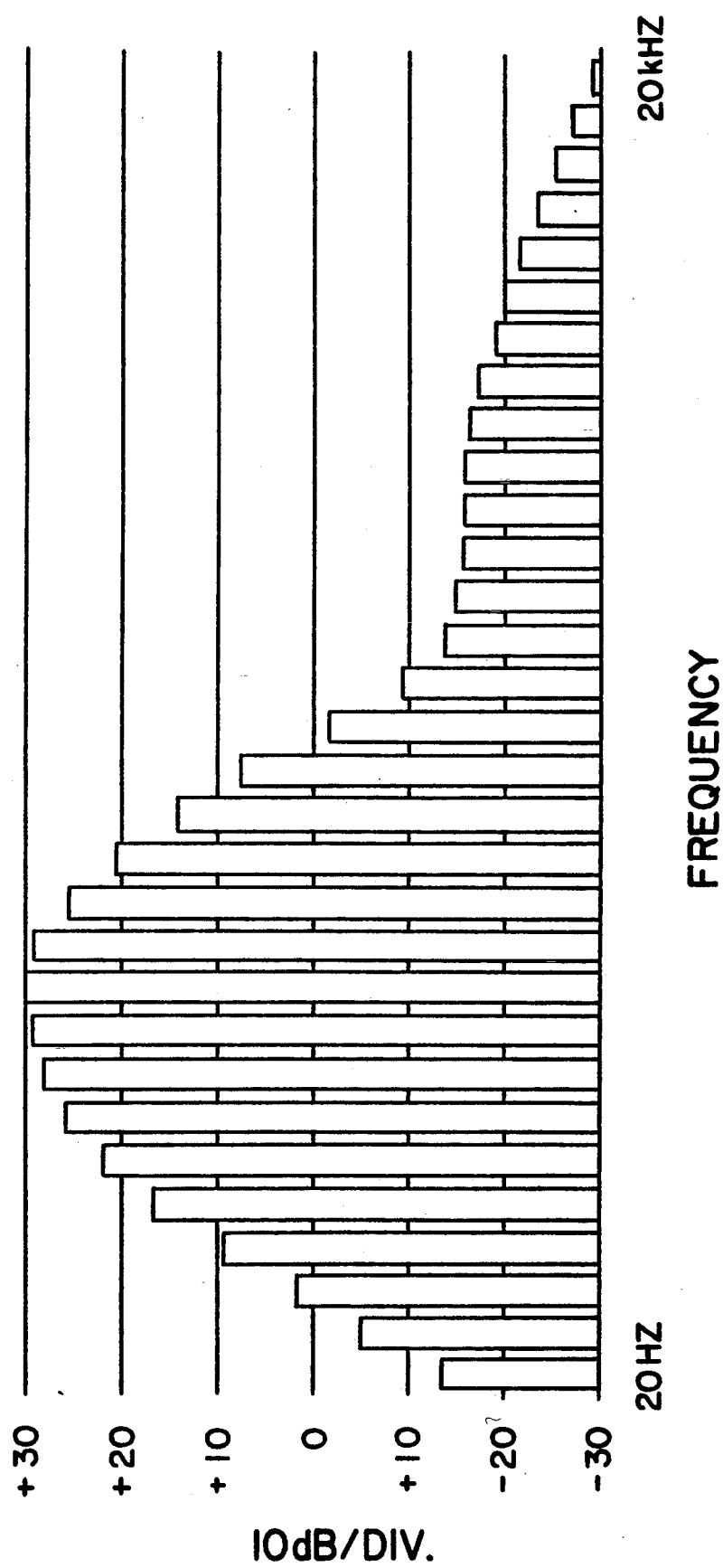
FIG. 2 is a graph of the speaker drive amplitude vs frequency of an apparatus of the invention.

The designs for circuits to produce white and pink noise are known in the art, and any circuit that produces sound from 100 Hz to 10 KHz with no outstanding pure tones will function in the invention. The preferred circuit provides an output similar to that shown in FIG. 2. The relative speaker drive amplitude is shown in dB as a function of sound frequency. Each bar represents a one-third octave band, each one-third octave band differs in strength by no more than 8 dB from its neighbors, and the drive amplitudes for frequencies from 80 to 500 Hz are 25 dB stronger than for the frequencies above 1000 Hz.

Figure 4:
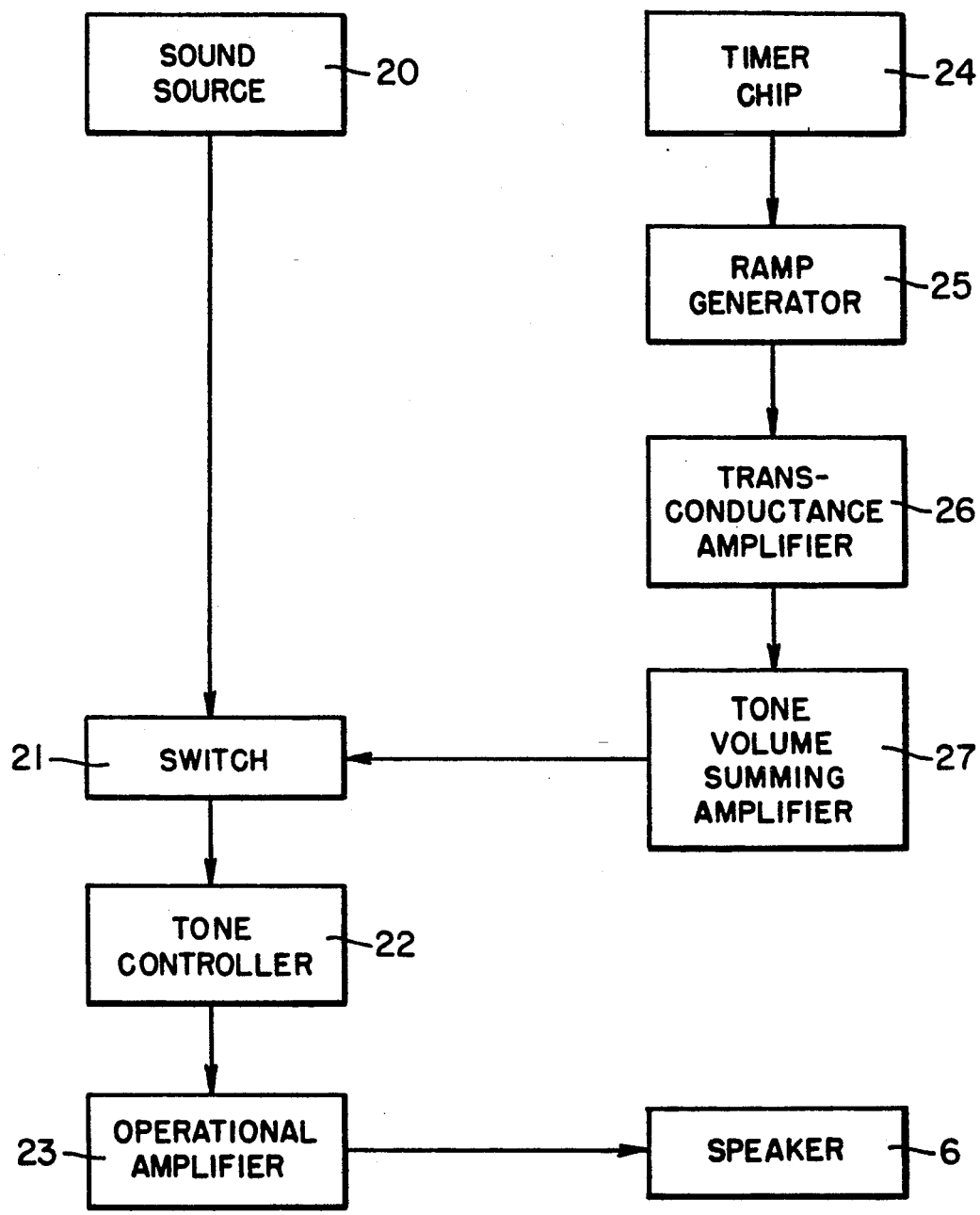
FIG. 4 is a block diagram of a sound generating circuit suitable for the invention.

A circuit that produces controllable sound output of the proper distribution and strength is shown in the block diagram in FIG. 4. A sound source 20, typically a combination of a transistor with voltage reversed above the breakdown level, an amplifier, a high pass filter to remove the DC component and a second general purpose amplifier, provides an output to a switch 21, which uses the input from the sound source alone, or combines the input of the sound source with the input from an optional wave circuit 24–27 to be discussed below. The switch, which may incorporate a volume control, provides, at the user's discretion, an output to a tone controller 22, which is attached to an operational amplifier 23 and ultimately to a speaker 6. To produce a particularly pleasing white or pink noise that resembles the sound of ocean waves breaking on a beach, an additional wave circuit may be added. A timer chip 24 provides output to a ramp generator 25, to a transconductance amplifier 26 and thence to a tone/volume summing amplifier 27. The output of amplifier 27 is used as input by switch 21 according to the decision of the user.

The apparatus incorporates a fragrance-release apparatus through which users can release fragrances of their choice into the air. This mechanism is intimately linked with the air filtration system. Air flow passes over the fragrance release apparatus 11 where an optional control (not shown) permits users to modulate air entering and carrying fragrance out into the environment; in the closed position no air can enter this apparatus and no fragrance is released. The amount of air passing over the fragrance-containing medium can be readily regulated so that, at users' discretion, varying amounts of fragrance are released.

Odors that are regarded as pleasant are encompassed by the term fragrances, and, in general, any fragrance will function in the instant invention. Since smell is a combination of chemical stimulus and subjective response, the concept of "pleasant" can be a function of concentration of the chemical stimulus, as well as age, sex and cultural background of the test subject. Notwithstanding its subjective nature, "pleasant" is not an undefinable term. Standard methods exist for measuring affective (i.e., subjective or evaluative) reactions to various stimuli. These methods are derived in part from extensive research on methods for measuring political or social attitudes. Such research indicates that under appropriate circumstances, valid and reliable measurements of positive or negative reactions to various stimuli can be obtained. In essence, these methods involve the following procedures:

(1) stimuli to be evaluated are presented to subjects in random order (i.e., stimuli predicted to fall at high, moderate, and low ends of the evaluative dimension are presented interspersed with one another in a random manner;

(2) these stimuli are presented in the absence of identifying characteristics (e.g., they are presented in identical locations, in identical, unmarked containers, etc.);

(3) subjects are asked to examine these stimuli in an appropriate manner (e.g., to look at them if they are visual in nature; to listen to them if they are auditory in nature, etc.) and then to express their affective (i.e., evaluative) reactions to these stimuli; and (4) subjects evaluate, in general, by marking numbers on a graded scale anchored, at the two extremes, by appropriate adjectives (e.g., unpleasant—pleasant; unattractive—attractive).

These methods can readily be applied to measuring the subjective pleasantness of various fragrances. For example, participants can be presented with various fragrances in identical bottles. They are instructed to smell each one, and then to rate it on scales such as the one shown below:

Rate the fragrance you have just smelled by circling one number:

```
Unpleasant                              Pleasant
    1     2     3     4     5     6     7
```

Virtually any fragrance can be rated in this fashion. By comparing the ratings of various fragrances, those judged by a given group of individuals to be most pleasant can be identified. Because of cultural and age differences, it is impossible to formulate a comprehensive list of fragrances that would be universally rated as very pleasant. However, for a given cultural or age group, such fragrances can be identified. For the instant invention the preferred fragrances are characterized in such a test paradigm as very pleasant by adults ages 20–55 currently living in the United States. Those that have been found particularly suitable because of their broad appeal are citrus, floral, eucalyptus and mint.

The preferred fragrances meet FDA standards for purity, safety, and nonallergenic properties.

Fragrances that have been used in the invention are available from Roure, Inc. (Teaneck, N.J.).

The means for releasing fragrance is optimally a porous plastic disc impregnated with fragrance during the molding process. When air passes over the disc, fragrance moves to the surface at a controlled rate and is released into the air. Discs that may be used are available as Interflo ® porous plastic from Chromex, Inc. (Brooklyn, NY). They have been formulated with 15 g of fragrance to last 60 days i.e. to release about 10 mg/hr on a continuous basis. Other means of releasing fragrance would include timed burstaerosols, volatile solid carriers, non-volatile solid carriers other than polyolefins (e.g. cellulose and porous ceramics), encapsulated fragrance coupled with mechanical means for rupturing the microcapsules, and ionization or electrostatic dispersal.

The arrangement of elements shown in FIG. 3 is particularly advantageous because it minimizes overall size and improves portability. Moreover, the circuit board and transformer are cooled by filtered air which adds to longevity and dependability. Other embodiments are possible. It is also advantageous to provide the filters in a single package which may be easily removed and replaced by the user.

While the invention has been particularly shown and described with reference to preferred embodiments thereof, it will be understood by those skilled in the art that other changes in form and details may be made therein without departing from the spirit and scope of the invention.

We claim:

1. An apparatus for enhancing the environmental quality of work and living spaces comprising:
   a) a portable housing;
   b) a high efficiency particulate arresting (HEPA) filter mounted in said housing, said HEPA filter having an intake surface and an output, said intake surface being accessible to air from the exterior of said housing;
   c) a gas adsorbing filter mounted in said housing, said gas adsorbing filter having an intake surface and an output surface, said intake surface of said gas adsorbing filter receiving air substantially entirely from said output surface of said HEPA filter;
   d) means for generating airflow from the exterior of said housing through said HEPA filter and said gas adsorbing filter and back to the exterior of said housing;
   e) means, disposed in said housing downstream of said gas adsorbing filter, for releasing into said airflow a controllable amount of fragrance; and
   f) means, disposed in said housing, for generating sound of a frequency and strength such that the combined acoustic output of said sound generating means and said airflow generating means is broad band noise having no outstanding pure tones, said acoustic output comprising sound waves in the range from 80 Hz to 10 KHz in frequency and 10 to 70 dB in strength.

2. An apparatus according to claim 1 wherein said acoustic output is pink noise.

3. An apparatus according to claim 1 wherein said gas adsorbing filter is a charcoal filter.

4. An apparatus according to claim 1 additionally comprising a prefilter disposed in said housing upstream of said HEPA filter.

5. An apparatus according to claim 1 wherein said means for generating sound provides a speaker drive output characterized in that each one-third octave band from 80 Hz to 10 KHz differs from its neighboring band by less than 8 dB.

6. An apparatus according to claim 5 further characterized in that said one-third octave bands are 25 dB stronger below 500 Hz than above 1000 Hz.

7. An apparatus according to claim 1 wherein said airflow is form 80 to 130 cfm (37 to 62 L/sec).

8. An apparatus accordign to claim 7 wherein said means for releasing a controllable amount of fragrance releases from 1 to 20 mg/hr of said fragrance.

9. An apparatus according to claim 8 wherein said fragrance is chosen from the group consisting of citrus, floral, eucalyptus and mint frangrances.

10. An apparatus according to claim 9 wherein said means for releasing said fragrance is a polyolefin body having said fragrance entrained therein.

11. An apparatus for enhancing the environmental quality of a workplace comprising:
   (a) a housing having two ends and first, second and third sides;
   (b) said ends being in the form of triangles;
   (c) said first, second and third sides being in the form of rectangles;
   (d) said first, second and third sides being joined each to one other at two opposite edges of said rectangles and to said ends at two other opposite edges of said rectangles;
   (e) said first side supporting a plurality of controls and an air intake;
   (f) said second side providing an air outlet;
   (g) said third side forming a base substantially in a horizontal plane; and
   (h) said housing enclosing filter means, air moving means, fragrance-releasing means and sound-generating means.

12. A method for enhancing the environment quality of a workspace comprising in combination:

(a) lowering the level of particulate matter in a body of air within said workspace below 10⁴ particles per liter;
(b) introducing a fragrance into said air in said workspace; and
(c) introducing broad band noise into said workspace, said broad band noise comprising sound waves in the range from 80 Hz to 10 KHz in frequency and 10 to 70 dB in strength and having no outstanding pure tones.

13. A method according to claim 12 wherein said fragrance is chosen from the group consisting of citrus, floral, eucalyptus and mint.

* * * * *

UNITED STATES PATENT AND TRADEMARK OFFICE
CERTIFICATE OF CORRECTION

PATENT NO. : 5,192,342

DATED : 03/09/93

INVENTOR(S) : Baron et al.

It is certified that error appears in the above-identified patent and that said Letters Patent is hereby corrected as shown below:

Column 8:

Claim 7, line 2, replace "form" with --from--

Claim 8, line 1, replace "accordign" with --according--

Claim 9, line 3, replace "euclayptus" with -- eucalyptus--

Signed and Sealed this

Twenty-first Day of December, 1993

Attest:

BRUCE LEHMAN

Attesting Officer

Commissioner of Patents and Trademarks